United States Patent
Layton (10) Patent No.: US 8,446,292 B2
(45) Date of Patent: May 21, 2013

(54) SYSTEMS AND METHODS FOR DOWNHOLE INSTRUMENT COMMUNICATION VIA POWER CABLE

(75) Inventor: James E. Layton, Chelsea, OK (US)

(73) Assignee: Baker Hughes Incorporated, Houston, TX (US)

(*) Notice: Subject to any disclaimer, the term of this patent is extended or adjusted under 35 U.S.C. 154(b) by 232 days.

(21) Appl. No.: 12/846,396

(22) Filed: Jul. 29, 2010

(65) Prior Publication Data

US 2012/0026003 A1 Feb. 2, 2012

(51) Int. Cl.
*G01V 3/00* (2006.01)

(52) U.S. Cl.
USPC ............... 340/854.9; 340/855.3; 340/855.4

(58) Field of Classification Search
USPC ............... 340/854.9, 855.3, 855.4; 370/474, 370/476; 375/261
See application file for complete search history.

(56) References Cited

U.S. PATENT DOCUMENTS

| | | | |
|---|---|---|---|
| 4,415,895 A | 11/1983 | Flagg | |
| 5,896,374 A * | 4/1999 | Okumura et al. | 370/311 |
| 6,587,037 B1 | 7/2003 | Besser et al. | |
| 6,914,538 B2 | 7/2005 | Baird et al. | |
| 7,026,952 B2 * | 4/2006 | Krueger | 340/855.3 |
| 2004/0244475 A1 | 12/2004 | Butler et al. | |
| 2005/0110655 A1 * | 5/2005 | Layton | 340/854.9 |
| 2006/0290528 A1 * | 12/2006 | MacPherson et al. | 340/853.1 |
| 2008/0272932 A1 | 11/2008 | Booker et al. | |

FOREIGN PATENT DOCUMENTS

WO   WO-01-03323   1/2001

* cited by examiner

*Primary Examiner* — Joseph Chang
*Assistant Examiner* — Jeffrey Shin
(74) *Attorney, Agent, or Firm* — Law Offices of Mark L. Berrier (57) ABSTRACT

Systems and methods for reliably communicating data between surface and downhole equipment over a power cable, regardless of the length of the power cable, wherein a transmitter modulates a common data stream onto multiple high frequency carrier signals, each of which has a different frequency. Each of the different frequencies is best suited to communication over a different length of cable. The resulting modulated high frequency data signals are impressed on the power cable and are recovered from the cable by a receiver. The receiver is configured to recover signals at each of the different carrier frequencies, at least one of which should be transmitted with little enough attenuation and interference that the data stream can be accurately recovered from the corresponding modulated high frequency data signal.

23 Claims, 4 Drawing Sheets

SYSTEMS AND METHODS FOR DOWNHOLE INSTRUMENT COMMUNICATION VIA POWER CABLE

BACKGROUND

1. Field of the Invention

The invention relates to systems for communication between surface and downhole equipment, and more particularly to systems and methods for reliably communicating data between surface and downhole equipment over a power cable, whether the cable is relatively short, long, or of intermediate length.

2. Related Art

Systems that provide communication between surface and downhole equipment (equipment positioned within a wellbore) over power cables are known. These systems may use various technologies, but typically, a transmitter coupled to the downhole equipment modulates a carrier signal with a data stream and impresses the modulated signal onto the power cable. A receiver coupled to the power cable at the surface then detects the modulated signal and demodulates the data stream from the signal.

The data stream, which may be acquired from sensors, produced by downhole equipment, or otherwise generated, may be encoded and modulated onto the carrier signal in a number of ways. The data may, for example, be frequency modulated, amplitude modulated, burst modulated, frequency shift key modulated, phase shift key modulated, etc. The modulated carrier signal may then be impressed onto the power cable, such as through a direct tap to the power cable, or through a reactive coupling. The receiver can be obtain the modulated carrier signal from the power cable using similar means, and can demodulate the data stream from the signal using complementary demodulation techniques. Communications can be unidirectional or bidirectional between downhole and surface equipment.

Signals that are carried over power cables are subject to interference and attenuation in the cable. Signals on the cable resonate at frequencies that are inversely proportional to the cable length (well depth) and attenuate in direct proportion to the cable length. Conventional systems use a single carrier signal that has a single frequency which is normally chosen so that it is high enough to avoid resonant interference in shallower wells, but low enough to minimize attenuation in deeper wells. While the carrier frequency may be optimized for a particular cable length, it cannot be optimized for multiple lengths; so the system may operate properly in some wells, but not in others.

It would therefore be desirable to provide systems and methods that enable reliable communications on the power cable between surface and downhole equipment, regardless of the length of the power cable.

SUMMARY OF THE INVENTION

This disclosure is directed to systems and methods for reliably communicating data between surface and downhole equipment over a power cable, whether the cable is relatively short, long, or of intermediate length. In particular, the systems and methods provide for the generation of multiple carrier signals having different frequencies, modulation of a common data stream onto the carrier signals, communication of the modulated signals over the power cable, recovery of at least one of the modulated signals, and demodulation of the data stream from the recovered signal.

One embodiment of the invention is a system for communication between surface equipment and downhole equipment over a power cable of indeterminate length. The system includes surface equipment, downhole equipment positioned in a borehole, and a power cable coupled between the surface and downhole equipment. The cable is configured to provide power from the surface equipment to the downhole equipment. The system further includes at least one transmitter and a receiver, both of which are coupled to the power cable. One of the transmitter and receiver is coupled to the surface equipment, and the other is coupled to the downhole equipment. The transmitter is configured to generate multiple high frequency carrier signals of different frequencies, modulate a common data stream onto each of these carrier signals, and impress the resulting modulated high frequency data signals on the power cable. The receiver is configured to recover one or more of the modulated high frequency data signals from the power cable and to demodulate the common data stream from at least one of these signals.

The transmitter may be configured to generate the high frequency carrier signals by generating a modified square wave, the components of which include sine waves at a fundamental frequency and one or more harmonics thereof. The carrier signals may be modulated with data from one or more sensors using burst modulation or other modulation schemes. The receiver may be configured to recover and demodulate the common data stream from one or more of the modulated high frequency data signals. The transmitter may be configured to transmit the high frequency data signals on the power cable concurrently with transmission of power over the power cable to the downhole equipment.

Another embodiment comprises a transmitter coupled to a power cable that carries power from surface equipment to downhole equipment. The transmitter is configured to generate multiple high frequency carrier signals of different frequencies, modulate a common data stream onto each of the carrier signals, and impress the resulting modulated high frequency data signals on the power cable.

Another embodiment comprises a receiver coupled to a power cable that carries power from surface equipment to downhole equipment. The receiver is configured to detect multiple high frequency data signals, each having a different carrier frequency. The receiver is further configured to recover one or more of the detected high frequency data signals from the power cable and to demodulate a data stream from at least one of these signals. If more than one of the high frequency data signals can be recovered from the power cable, the receiver may demodulate the data stream (which is common to the high frequency data signals) from more than one of the signals.

Another embodiment comprises a method for reliable communication between surface equipment and downhole equipment over a power cable of indeterminate length. The method comprises generating high frequency carrier signals of different frequencies, modulating high frequency carrier signals with a common data stream, impressing the data signals on the power cable, receiving the high frequency data signals from the power cable, and demodulating the common data stream from one or more of the high frequency data signals. The high frequency carrier signals may be generated by generating a modified square wave, the components of which include sine waves at a fundamental frequency and one or more harmonics thereof. The carrier signals may be modulated with data from one or more sensors using burst modulation or other modulation schemes. The receiver may be configured to recover and demodulate the common data stream from a single one or multiple ones of the modulated high frequency data signals. The high frequency data signals may be transmitted on the power cable concurrently with transmission of power over the power cable to the downhole equipment.

Another embodiment comprises a method for transmitting data over a power cable of indeterminate length. The method comprises generating high frequency carrier signals of different frequencies, modulating high frequency carrier signals with a common data stream, and impressing the data signals on the power cable. The high frequency carrier signals may be generated by generating a modified square wave, the components of which include sine waves at a fundamental frequency and one or more harmonics thereof. The carrier signals may be modulated with data from one or more sensors using burst modulation or other modulation schemes.

Another embodiment comprises a method for recovering data transmitted over a power cable of indeterminate length. The method comprises detecting one or more high frequency data signals on the power cable, recovering one or more of the high frequency data signals from the power cable, and demodulating a data stream from one or more of the high frequency data signals (all of which are modulated with a common data stream. The common data stream may be demodulated from a single one or multiple ones of the modulated high frequency data signals. Error checking may be performed on the demodulated data stream. The high frequency data signals may be recovered from the power cable concurrently with transmission of power over the power cable to the downhole equipment.

Numerous other embodiments are also possible.

BRIEF DESCRIPTION OF THE DRAWINGS

Other objects and advantages of the invention may become apparent upon reading the following detailed description and upon reference to the accompanying drawings.

While the invention is subject to various modifications and alternative forms, specific embodiments thereof are shown by way of example in the drawings and the accompanying detailed description. It should be understood, however, that the drawings and detailed description are not intended to limit the invention to the particular embodiment which is described. This disclosure is instead intended to cover all modifications, equivalents and alternatives falling within the scope of the present invention as defined by the appended claims.

DETAILED DESCRIPTION OF EXEMPLARY EMBODIMENTS

One or more embodiments of the invention are described below. It should be noted that these and any other embodiments described below are exemplary and are intended to be illustrative of the invention rather than limiting.

As described herein, various embodiments of the invention comprise systems and methods for reliably communicating data between surface and downhole equipment over a power cable, regardless of the length of the power cable.

The present systems and methods utilize multiple high frequency data signals that are modulated with a common data stream. Each of the high frequency data signals has a different carrier frequency and may therefore be well-suited for transmission over different lengths of cable. The high frequency data signals are all transmitted over the power cable. A receiver which is capable of receiving and demodulating all three signals receives those of the signals that are successfully transmitted (i.e., are not substantially attenuated or degraded) and demodulates the common data stream from at least one of the data signals.

In one embodiment, a transmitter produces multiple high frequency carrier signals by generating a modified or distorted square wave. This modified square wave can be decomposed into multiple sine waves, including a first signal at a fundamental frequency and one or more additional signals at odd and even harmonics of the fundamental frequency. The modified square wave is modulated with a data stream, so the sine waves that make up the modified square wave are modulated with this data as well. The carrier waves are modulated in this embodiment using burst modulation (carrier=1, no carrier=0), which minimizes required transmission power and can be implemented with relatively simple, temperature-insensitive circuitry.

The receiver in this embodiment receives the data signals at each of the harmonic frequencies and attempts to demodulate them. Error checking is performed to determine whether the received and demodulated signals are error free. When at least one of the data signals is reliably received, the receiver may continue to receive and demodulate only that signal. The demodulated data is provided by the receiver to a user or other consumer of the information (e.g., a control system).

Figure 1:
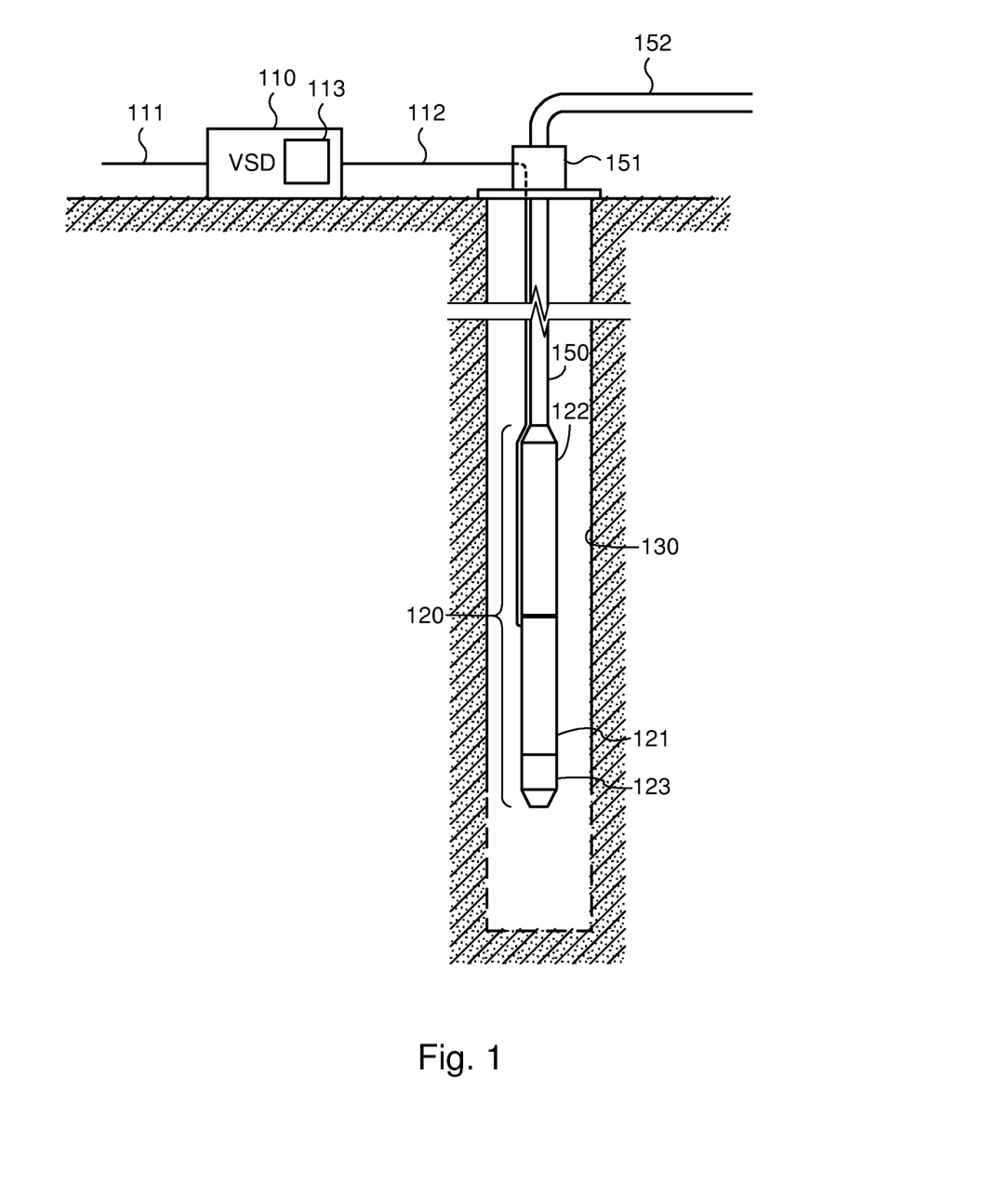
FIG. 1 is a diagram illustrating an exemplary pump system in accordance with one embodiment.

Referring to FIG. 1, a diagram illustrating an exemplary pump system in accordance with one embodiment of the present invention is shown. A wellbore 130 is drilled into an oil-bearing geological structure and is cased. The casing within wellbore 130 is perforated at the lower end of the well to allow oil to flow from the formation into the well. Electric submersible pump 120 is coupled to the end of tubing string 150, and the pump and tubing string are lowered into the wellbore to position the pump in a producing portion of the well (as indicated by the dashed lines at the bottom of the wellbore). A variable speed drive 110 which is positioned at the surface is coupled to pump 120 by power cable 112, which runs down the wellbore along tubing string 150. Tubing string 150 and power cable 112 may have a range of lengths (e.g., from less than one thousand feet in a shallow well, to many thousands of feet in a deeper well).

Pump 120 includes an electric motor section 121 and a pump section 122. A gauge package 123 is attached to the bottom of motor section 121. (Pump 120 may include various other components which will not be described in detail here because they are well known in the art and are not important to a discussion of the invention.) Motor section 121 is operated to drive pump section 122, which actually pumps the oil through the tubing string and out of the well. In this embodiment, motor section 121 uses an induction motor which is driven by variable speed drive 110. Variable speed drive 110 receives AC (alternating current) input power from an external source such as a generator (not shown in the figure) via input line 111. Drive 110 rectifies the AC input power and then produces output power that is suitable to drive motor section 121 of pump 120. This output power is provided to motor section 121 via power cable 112.

Drive 110 and gauge package 123 include transceivers (113 and 123, respectively) for communicating information between the drive and the pump system. For example, gauge package 123 includes sensors that measure various physical parameters that need to be communicated to drive 110, and drive 110 may generate control information that needs to be communicated to the pump system to control its operation. In this embodiment, transceivers 113 and 123 are each coupled to power cable 112 and communicate over the power cable using multiple high frequency signals that do not interfere with the transmission of power (i.e., drive signals) from drive 110 to pump system 120.

The high-frequency signals that are communicated over the power cable include multiple signals, each of which uses a different carrier frequency, the each of which is modulated with a common data stream. The different carrier frequencies are selected to enable reliable communications over cables a different lengths. Higher frequencies are more useful in shallower wells to avoid resonant interference. Lower frequencies are more useful in deeper wells, where resonance is lower, but attenuation of higher frequencies increases. Because the same data is simultaneously transmitted using different carrier frequencies, the carrier frequency that is best suited for transmission over the length of a particular power cable will likely be transmitted without error.

In one embodiment, generation of multiple high-frequency carrier signals is accomplished by generating a modified square wave. Because the modified square wave can be decomposed into multiple sine waves, generating the sine wave effectively generates the component sine waves. Likewise, modulating the modified square wave with a particular data stream effectively modulates the component sine waves with that data stream. Finally, impressing the modulated, modified square wave onto the power cable has the same effect as impressing the modulated component sine waves on the power cable. A receiver which is designed to recover signals at the frequencies of the component sine waves can then retrieve from the power cable whichever of the modulated carrier signals is successfully transmitted over the length of the power cable.

In one embodiment, the system is configured to generate a distorted square wave which produces odd and even harmonics of the fundamental frequency. The distorted square wave has a fundamental frequency of approximately 33 kHz. This carrier is modulated using burst modulation. In other words, the presence of the carrier is interpreted as a data "1", and the absence of the carrier is interpreted as a data "0". This type of modulation is convenient because it can be accomplished with relatively simple, temperature-insensitive transmitter circuitry. Burst modulation is also beneficial in that it minimizes the power required for transmission of data.

The receiver in this system is designed to recover carrier signals at the fundamental frequency and the second and third harmonics of this frequency. The receiver recovers these signals simultaneously. The receiver may, for example, utilize heterodyne mixing and intermediate frequency filtering to discriminate, amplifying and detect bursts of the each of these carrier frequencies. Because the data rate at which the transmitter modulate the carrier signals is known, the receiver can use a data filter proportioned to the known data rate, followed by a comparator, to demodulate the data stream from the carrier signals and reconstruct the digital data stream.

The data stream that is reconstructed by the receiver can be delivered to a microprocessor for processing. This processing many, for example, include FIR filtering, bit synchronization, byte synchronization, assimilation of data transfers, and so on. The assimilated data can then be provided to a user or data processing device via standard data transfer methods (e.g., RS-232 or RS-485 data transfers).

Figure 2:
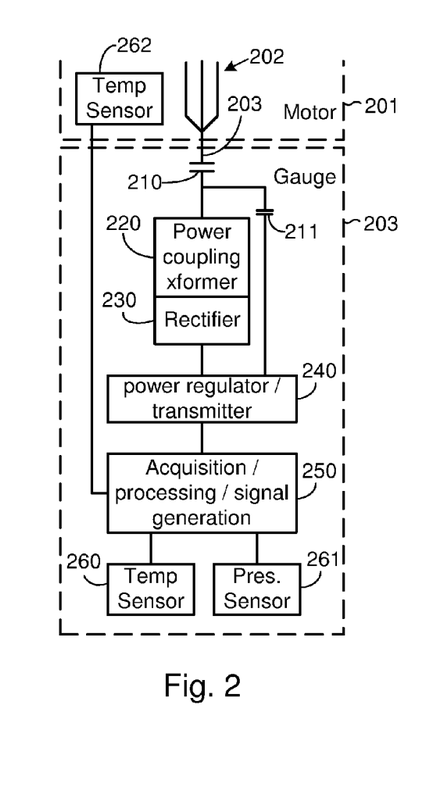
FIG. 2 is a diagram illustrating an exemplary gauge package coupled to a pump motor in accordance with one embodiment.

Referring to FIG. 2, a diagram illustrating an exemplary gauge package employing the present system is shown. In this figure, gauge 200 is attached to the lower end of a motor 201. Motor 201 receives three-phase power on windings 202. Gauge 200 is electrically coupled to the "Wye" point (or "Y" point) 203 of motor windings 202. Power is provided to power coupling transformer 220 of gauge 200 through a high-voltage power and signal coupling capacitor 210. The output of power coupling transformer 220 is rectified by rectifier 230 and is provided to power regulator/transmitter circuitry 240, which in turn provides power to circuitry that performs signal acquisition and processing and carrier signal generation (250). Sensors continue to monitor downhole temperature and pressure (260, 261) and motor temperature (262) are coupled to acquisition circuitry 250.

Sensors 260-262 monitor the corresponding environmental parameters and generate sensors signals that are input to processing circuitry 250. Circuitry 250 generates a data stream encoding the information received from the sensors, generates a distorted square wave carrier signal, and modulates the data stream onto the carrier signal. The modulated carrier signal is passed to transmitter circuitry 240. Transmitter circuitry 240 couples the modulated carrier signal through capacitor 211 to the Wye point of the motor windings so that it will be transmitted over the power cable to a receiver at the surface of the well.

Figure 3:
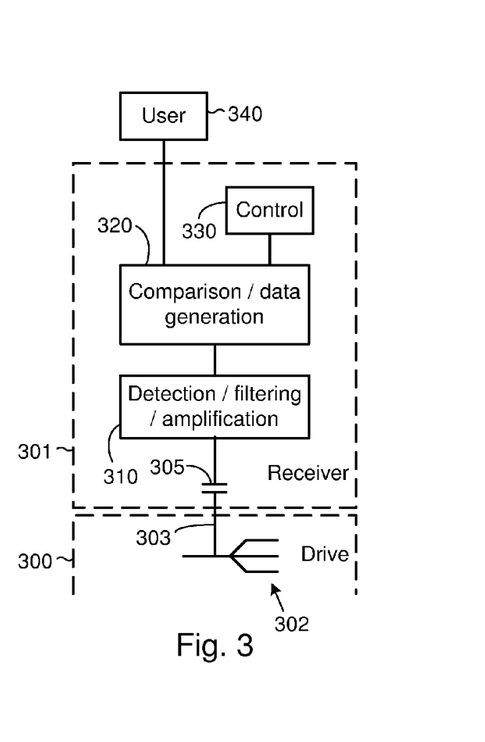
FIG. 3 is a diagram illustrating an exemplary receiver coupled to a motor controller in accordance with one embodiment.

Referring to FIG. 3, a diagram illustrating an exemplary receiver coupled to the motor controller (drive) is shown. The surface equipment for the well includes a motor controller, such as a variable speed drive 300. Drive 300 generates three-phase power that is provided to the ESP system via power cable 302. Receiver 301 is connected to the Wye point 303 of the drive output via signal coupling capacitor 305. This allows circuitry 310 to detect the high-frequency carrier signals that are impressed upon the power cable. The high-frequency signals are filtered and amplified by circuitry 310 and are then passed to circuitry 320 for processing. Circuitry 320 includes a comparator to convert the modulated high-frequency carrier signals into binary data streams, which can be further filtered and bit/byte synchronized. Circuitry 320 performs error checking on one or more of the data streams to ensure the integrity of the received data. The data can then be output to either control/analysis systems 330 or a user 340.

Because more than one of the high frequency carrier signals may be successfully received by the receiver, the processing of these signals may be handled in various ways. In one embodiment, the receiver may be configured to continually detect all of the available carrier frequencies and to simultaneously demodulate all of these high frequency signals. For each frequency on which a synchronization pattern is detected, a data packet is received and stored. For each of the received data packets, an error code is computed and compared to the corresponding received error code. The data packet from the first of the frequencies for which the error codes match is then moved to a buffer, and the user or consumer of the data is notified that the data is available.

In another embodiment, the receiver may be configured at startup to detect any of the possible carrier signals (e.g., the fundamental, second and third harmonics of a modified or distorted square-wave carrier signal generated by the transmitter). When one of these carrier signals is detected, the receiver processes the signal and demodulates the data stream from the signal. If this can be done successfully, and if error checking verifies the integrity of the data, the receiver will simply continue to demodulate the data stream from this signal. If the receiver cannot successfully process the first carrier signal, the receiver will attempt to detect a second carrier signal at a different one of the possible frequencies. If the receiver can successfully receive and demodulate error-free data from the carrier signal at the second frequency, the receiver will continue to demodulate the data stream from this signal. This procedure may be repeated with each successive possible frequency until the corresponding carrier signal can be successfully received and the modulated to produce an error-free data stream.

Figure 4:
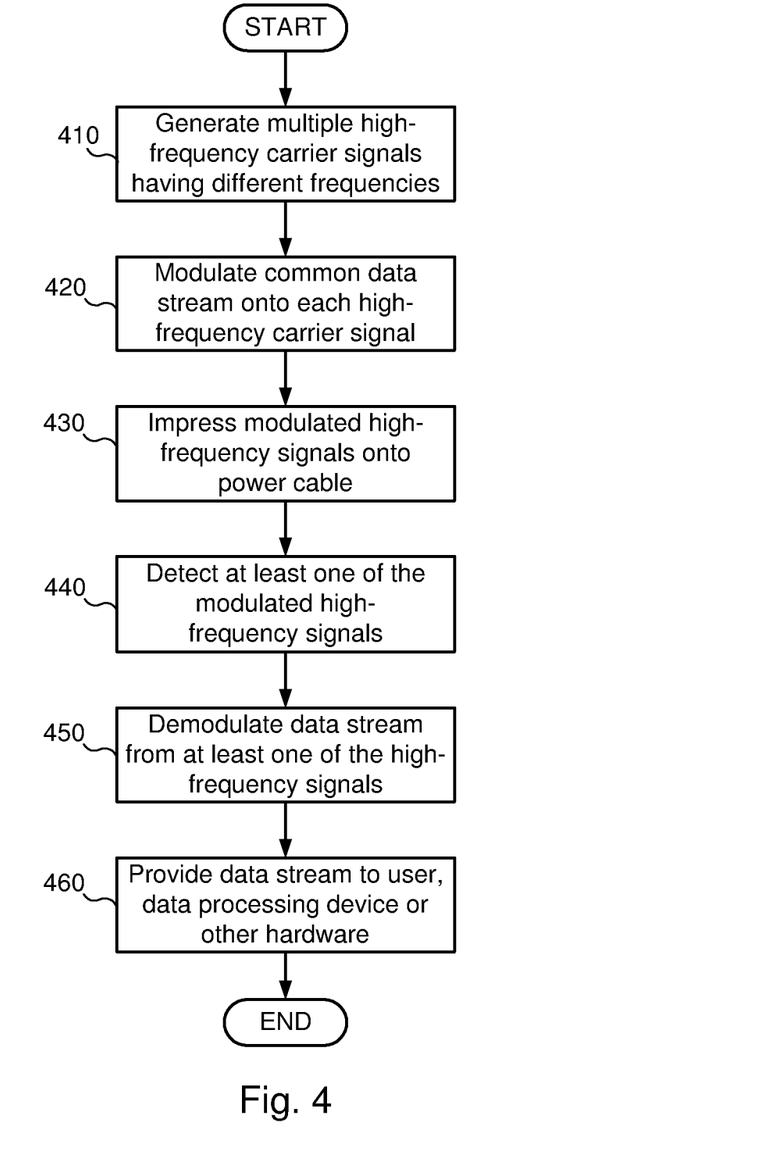
FIG. 4 is a flow diagram illustrating a basic method for communicating data from a transmitter to a receiver in accordance with one embodiment.
Figure 5:
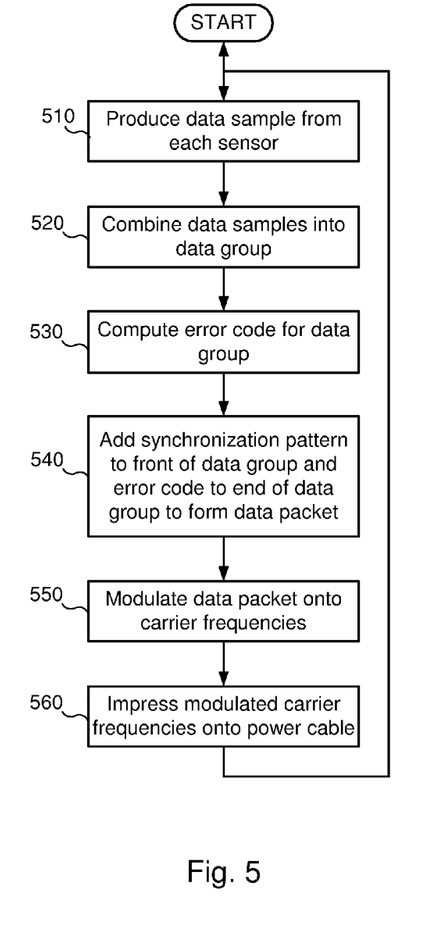
FIG. 5 is a flow diagram illustrating an exemplary method by which data is generated, processed and transmitted from a transmitter coupled to one or more sensors.
Figure 6:
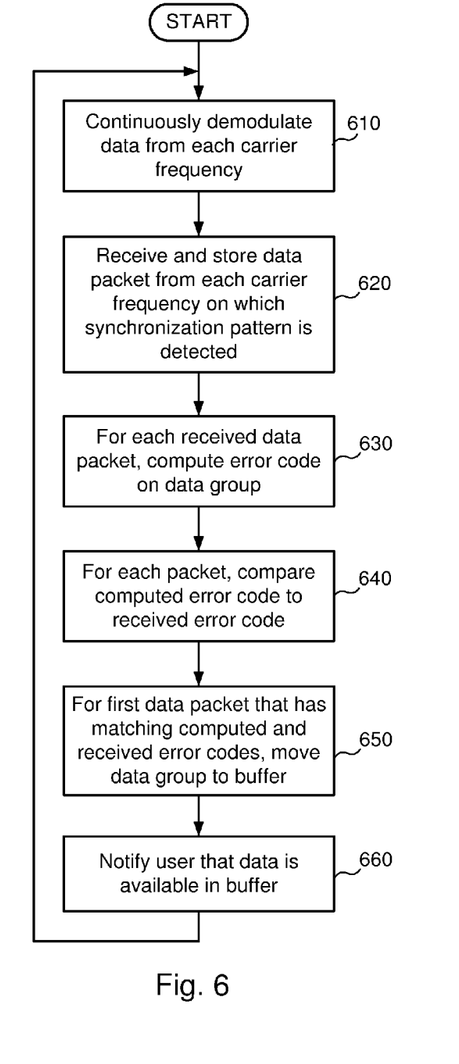
FIG. 6 is a flow diagram illustrating an exemplary method by which data is received and processed at the receiver to provide sensor data to a user.

It should be noted that the embodiments of the invention may include methods in addition to the systems described above. Exemplary methods are illustrated in the flow diagrams of FIGS. 4-6. FIG. 4 is a flow diagram illustrating a simplified method in which data is communicated from a transmitter to a receiver, one of which is coupled to the downhole equipment, and the other of which is coupled to the surface equipment. FIG. 5 is a flow diagram illustrating in more detail an exemplary method by which data is generated, processed and transmitted from a transmitter coupled to one or more sensors. FIG. 6 is a flow diagram illustrating in detail an exemplary method by which data is received and processed at the receiver to provide sensor data to a user.

In the method of FIG. 4, multiple high-frequency carrier signals are first generated (410). As explained above, this may be conveniently accomplished by generating a modified square wave that includes components at a fundamental frequency and one or more harmonics of this frequency. Each of the multiple high-frequency carrier signals is then modulated with a common data stream (420). This data stream may, for example, represent data that is generated from the output of one or more downhole sensors that monitor parameters such as temperature, pressure, flow rates, and the like. The multiple modulated high-frequency carrier signals are then impressed on the power cable (430).

The receiver attempts to detect the modulated high-frequency carrier signals on the power cable and recover the signals (440). The receiver may recover all of the available signals (those signals that are not too attenuated or noisy), or it may recover only a single one of the signals. After one or more of the modulated high-frequency signals has been detected and recovered from the power cable, these signals may be filtered, amplified or otherwise processed. The signals are then demodulated to recover the data stream (450). Again, this may be performed on one or all of the available signals. Error checking, such as a CRC check, is performed on the recovered data stream to verify the integrity of the data. The data is then provided to a user or passed to another component of the system, such as control circuitry, for processing.

As depicted in FIG. 5, data is generated by one or more sensors (510) which are located downhole, and the data is assimilated into a data group (520) to be communicated to a user at the surface. An error code is computed for the data group (530) so that accurate transmission of the data can later be verified. A synchronization pattern is appended to the front of the data group, and the error code is appended to the end of the data group to form a data packet (540). This data packet is modulated onto each of the multiple carrier frequencies (550), and the modulated carrier frequencies are impressed on the power cable. This process is repeated for each data group.

As shown in FIG. 6, each of the carrier frequencies is continuously monitored at the surface, and data is demodulated from the carrier frequencies to recover each data packet (610). When a synchronization pattern is detected on one of the carrier frequencies, a corresponding data packet is recovered and stored (620). For each recovered data packet, an error code is computed based on the data group in the packet (630). This computed error code is compared to the error code that was contained in the recovered packet (640) to verify the integrity of the data group in the packet. Because the same data packet is simultaneously transmitted on each of the carrier frequencies, the data packet only needs to be recovered from one of the carrier frequencies. Consequently, when a first one of the packets is verified (the computed error code matches the contained error code), the data group from this packet is stored in a buffer (650), and the user (a person or a process that consumes the data) is notified that the data is available (660). This process is repeated to recover each successive packet transmitted over the power cable.

Alternative embodiments may include methods for transmitting data and methods for recovering data as described above. An exemplary method for transmitting data is shown by steps 410-430 of FIG. 4. An exemplary method for recovering data is shown by steps 440-460 of FIG. 4.

Alternative embodiments of the invention may incorporate variations of the features and functions described above. For example, while the foregoing description details only the transmission of data from a downhole gauge package to a receiver coupled to the surface equipment, the communication of data may be either unidirectional or bidirectional. Unidirectional communications may be transmitted either from the downhole equipment to the surface equipment, or from the surface equipment to the downhole equipment. In bidirectional systems, transceivers that include the functions of both the transmitter and receiver described above are incorporated into both the downhole and surface equipment.

Alternative embodiments of the present systems may include transceivers that are located at positions other than within the gauge package connected to the bottom of the pump motor. ("Transceivers" should be construed to include transmitters and receivers individually, as well as in combination.) Transceivers may be incorporated into the motor itself, or into other downhole equipment. Transceivers may also be configured as essentially stand-alone units that are independently coupled to the power cable, apart from equipment such as ESP systems. For instance, a transceiver and one or more sensors may be coupled together and positioned at intermediate locations in the well. The various embodiments of the present system may include one or multiple downhole transceivers. If multiple downhole transceivers are used, they may employ various schemes to allow them to communicate individually with surface transceivers. For example, each of the downhole transceivers may use a different set of frequencies to communicate with the surface transceiver, or the downhole transceivers may use time division multiplexing, an arbitration scheme or other means to facilitate communications between the different transceivers.

It should be noted that, while at least two high frequency carrier signals having different frequencies are required for the implementation of the present system, the particular frequencies and the means for generating these carrier signals may vary from one embodiment to the other. It is not necessary that the carrier signals be produced by generating a modified square wave, or that the carrier signals be harmonics.

The high frequency carrier signals can be modulated in various ways. In the embodiments described above, burst modulation is used. Burst modulation can be implemented with relatively simple, temperature-insensitive circuitry, which is well suited to downhole applications. Burst modulation also minimizes the power required for transmission of the modulated carrier signals. Nevertheless, numerous other modulation schemes such as frequency modulation, amplitude modulation, frequency shift key modulation, phase shift key modulation, etc. may be used in alternative embodiments.

As described above, the high frequency carrier signals are communicated between the downhole and surface equipment by impressing the signals on the power cable. This is accomplished in the foregoing embodiments by capacitively coupling the transmitter to the Wye point of the motor or drive. The receiver is similarly coupled to the power cable. In alternative embodiments, other means can be used to impress the high frequency carrier signals on the power cable and to detect the signals. For example, the transmitters and receivers may be reactively coupled to the power cable by capacitive sleeving around one or more of the conductors in the cable.

While the present disclosure describes a system for communication that includes both a surface transceiver and a downhole transceiver, it is contemplated that alternative embodiments include the components of this system. For instance, one embodiment is a transmitter that is configured to generate multiple carrier frequencies, modulate a common data stream onto each of the multiple carrier frequencies, and impress each of the modulated carrier signals onto a power cable as described above. Another alternative embodiment is a receiver that is configured to detect one or more modulated carrier signals on a power cable, demodulate these carrier signals, and recover a data stream from the carrier signals as described above. Still other alternative embodiments include methods for transmitting and/or receiving a data stream via a power cable as described above.

Those of skill will further appreciate that the various illustrative logical blocks, modules, circuits, and algorithm steps described in connection with the embodiments disclosed herein may be implemented as electronic hardware, computer software (including firmware,) or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Similarly, the particular hardware or software components that are chosen to implement the described functionality may be selected to achieve specific design goals. Those of skill in the art may implement the described functionality in varying ways for each particular application, but such implementation decisions should not be interpreted as causing a departure from the scope of the present invention.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the claims. As used herein, the terms "comprises," "comprising," or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

What is claimed is:

1. A system for communication between surface equipment and downhole equipment over a power cable of indeterminate length, the system comprising:
   surface equipment;
   downhole equipment positioned in a borehole;
   a power cable coupled between the surface equipment and the downhole equipment and configured to provide power from the surface equipment to the downhole equipment; and
   a transmitter coupled to one of the surface equipment and the downhole equipment and a receiver coupled to the other of the surface equipment and the downhole equipment;
   wherein the transmitter is configured to generate a plurality of modulated high frequency data signals and to transmit the high frequency data signals on the power cable, wherein each of the high frequency data signals has a different frequency, and wherein each of the high frequency data signals is modulated to carry a common data stream;
   wherein the receiver is configured to receive the plurality of high frequency data signals and to demodulate the common data stream from at least one of the high frequency data signals.

2. The system of claim 1, wherein the at least one transmitter is coupled to the downhole equipment and the at least one receiver is coupled to the surface equipment, the system further comprising one or more sensors coupled to the at least one transmitter, wherein the common data stream comprises data received by the at least one transmitter from the one or more sensors.

3. The system of claim 1, wherein the at least one transmitter is configured generate the plurality of modulated high frequency data signals by generating a modified square wave at a first frequency and modulating the modified square wave to carry the common data stream, wherein one or more sine wave components of the modulated modified square wave form the plurality of modulated high frequency data signals.

4. The system of claim 1, wherein the plurality of modulated high frequency data signals are burst modulated.

5. The system of claim 1, wherein the receiver is configured to:
   (a) demodulate data from each of the high frequency data signals;
   (b) for each of the high frequency data signals on which a synchronization pattern is detected,
       store a data packet that includes the synchronization pattern,
       compute a first error code based on a data group in the data packet, and
       compare the first error code to a second error code which is contained in the data packet; and
   (c) store in a buffer a data group contained in one of the data packets for which the first error code matches the second error code.

6. The system of claim 1, wherein the transmitter is configured to transmit the high frequency data signals on the power cable concurrently with transmission of power to the downhole equipment on the power cable.

7. A method for reliable communication between surface equipment and downhole equipment over a power cable of indeterminate length, the method comprising:

modulating a plurality of high frequency data signals with a common data stream, wherein each of the high frequency data signals has a different frequency;

transmitting the data signals on the power cable;

receiving the plurality of high frequency data signals; and demodulating the common data stream from at least one of the high frequency data signals.

8. The method of claim 7, wherein modulating a plurality of high frequency data signals comprises modulating a modified square wave having a first frequency with the common data stream and thereby producing modulated sine waves at the first frequency and one or more harmonics of the first frequency.

9. The method of claim 7, further comprising transmitting power over the power cable concurrently with transmitting the high frequency data signals.

10. The method of claim 7, further comprising receiving data from one or more downhole sensors and generating the common data stream in dependence upon the data from the one or more downhole sensors.

11. The method of claim 7, further comprising:
(a) demodulating data from each of the high frequency data signals;
(b) for each of the high frequency data signals on which a synchronization pattern is detected,
 storing a data packet that includes the synchronization pattern,
 computing a first error code based on a data group in the data packet, and
 comparing the first error code to a second error code which is contained in the data packet; and
(c) storing in a buffer a data group contained in one of the data packets for which the first error code matches the second error code.

12. An apparatus for use in a downhole communication system, the apparatus comprising:
a transmitter;
wherein the transmitter is configured to receive a data stream;
wherein the transmitter is configured to generate a plurality of high frequency data signals, each of the high frequency data signals having a different frequency;
wherein the transmitter is configured to modulate the plurality of high frequency data signals with a common data stream;
wherein the transmitter is configured to be coupled to a downhole power cable;
wherein the transmitter is configured to transmit the plurality of modulated high frequency data signals on the downhole power cable.

13. The apparatus of claim 12, wherein the transmitter is configured to concurrently receive power via the power cable and to transmit the plurality of modulated high frequency data signals on the power cable.

14. The apparatus of claim 12, a data acquisition unit coupled to the transmitter and configured to generate the common data stream.

15. The apparatus of claim 14, further comprising one or more sensors coupled to the data acquisition unit, wherein the data acquisition unit is configured to receive sensor data from the one or more sensors and to generate the common data stream in dependence upon the received sensor data.

16. The apparatus of claim 12, wherein the transmitter is configured generate the plurality of modulated high frequency data signals by generating a modified square wave at a first frequency and modulating the modified square wave to carry the common data stream, wherein one or more sine wave components of the modulated modified square wave form the plurality of modulated high frequency data signals.

17. An apparatus for use in a downhole communication system, the apparatus comprising:
a receiver;
wherein the receiver is configured to be coupled to a downhole power cable;
wherein the receiver is configured to receive a plurality of high frequency data signals from the power cable, each of the high frequency data signals having a different frequency, and each of the high frequency data signals having a common data stream modulated thereon;
wherein the receiver is configured to demodulate the common data stream from one or more of the plurality of high frequency data signals.

18. The apparatus of claim 17, wherein the receiver is configured to receive the plurality of modulated high frequency data signals from the power cable while power is transmitted over the power cable to one or more devices.

19. The apparatus of claim 17, wherein the receiver is configured to:
(a) demodulate data from each of the high frequency data signals;
(b) for each of the high frequency data signals on which a synchronization pattern is detected,
 store a data packet that includes the synchronization pattern,
 compute a first error code based on a data group in the data packet, and
 compare the first error code to a second error code which is contained in the data packet; and
(c) store in a buffer a data group contained in one of the data packets for which the first error code matches the second error code.

20. A method for transmission of data over a power cable of indeterminate length, the method comprising:
generating a plurality of high frequency carrier signals, wherein each of the high frequency data signals has a different frequency;
modulating the plurality of high frequency carrier signals with a common data stream, thereby producing high frequency data signals; and
impressing the high frequency data signals on the power cable.

21. The method of claim 20, wherein modulating a plurality of high frequency data signals comprises modulating a modified square wave having a first frequency with the common data stream and thereby producing modulated sine waves at the first frequency and one or more harmonics of the first frequency.

22. A method for recovering data transmitted over a power cable of indeterminate length, the method comprising:
receiving a plurality of high frequency data signals from a power cable, wherein each of the high frequency data signals comprises high frequency carrier signal having a unique frequency, and wherein each of the high frequency data signals is modulated with a common data stream;
demodulating the common data stream from at least one of the high frequency data signals.

23. The method of claim 22, further comprising:
(a) demodulate data from each of the high frequency data signals;
(b) for each of the high frequency data signals on which a synchronization pattern is detected,
 storing a data packet that includes the synchronization pattern, computing a first error code based on a data group in the data packet, and comparing the first error code to a second error code which is contained in the data packet; and (c) storing in a buffer a data group contained in one of the data packets for which the first error code matches the second error code.

\* \* \* \* \*